A. F. MEYER.
STOCK FEEDING MACHINE.
APPLICATION FILED AUG. 11, 1914.
1,212,144.
Patented Jan. 9, 1917.
2 SHEETS—SHEET 1.
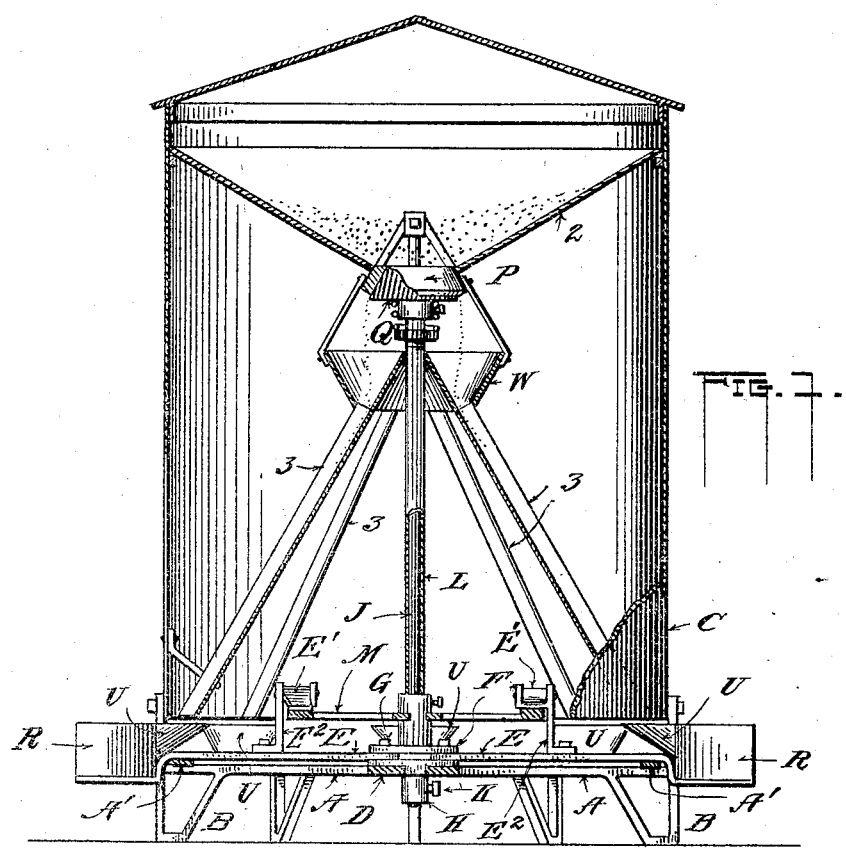
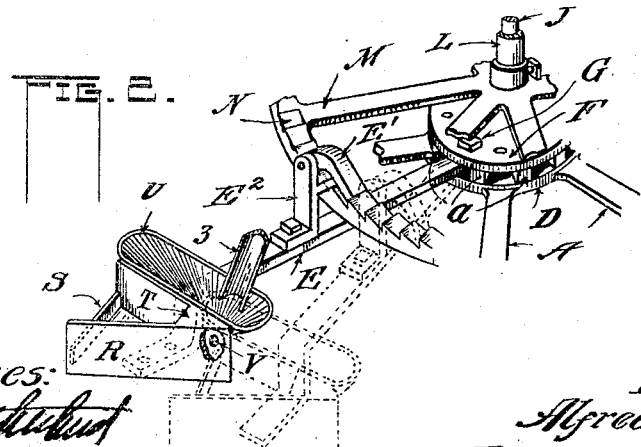

A. F. MEYER.
STOCK FEEDING MACHINE.
APPLICATION FILED AUG. 11, 1914.

1,212,144.

Patented Jan. 9, 1917.
2 SHEETS—SHEET 2.

UNITED STATES PATENT OFFICE.

ALFRED F. MEYER, OF MORTON, ILLINOIS, ASSIGNOR TO WILLIAM H. SIMMONS, OF MINNEAPOLIS, MINNESOTA.

STOCK-FEEDING MACHINE.

1,212,144.  Specification of Letters Patent.  Patented Jan. 9, 1917.

Application filed August 11, 1914. Serial No. 856,304.

*To all whom it may concern:*

Be it known that I, ALFRED F. MEYER, citizen of the United States, residing at Morton, in the county of Tazewell and State of Illinois, have invented certain new and useful Improvements in Stock-Feeding Machines; and I do hereby declare that the following is a full, clear, and exact description of the invention, which will enable others skilled in the art to which it appertains to make and use the same.

This invention relates to a stock feeding machine and more particularly to a stock feeding machine in which grains or other feeding material placed therein is ground or reduced by mechanism operated by the animals, the reduced material being deposited in pans or trays from which the animals feed.

The object of the invention is to provide a new and novel structure in a simple form of machine of this class requiring but small effort of the animal to operate the feed reducing mechanism.

My construction includes a series of arms each of which carries a feeding pan or tray, said arms being preferably pivotally mounted and adapted to have a lateral swinging movement, there being included in the structure means by which the arms in their swinging movement impart a progressive movement to one of the feed grinding or reducing members.

It is my purpose in constructing a device of this kind to provide a device from which the animal can feed without moving from a position taken at the feeding pan or tray, and which will merely require him to impart movement to the grinding mechanism by pressure upon or against the pan or tray.

In one of the types of feeding machines, of which I am aware, the animal is required to walk around the machine continually in order to reach the feed and operate the grinding mechanism, but this is found in practice to be undesirable because of the fact that the animal " runs off " flesh which the grain or other material always on hand in the machine is designed to produce. In consequence of this I have devised a type of machine at which the animal can feed without moving out of position and therefore advantageous as compared with the older form mentioned.

Figure 3:
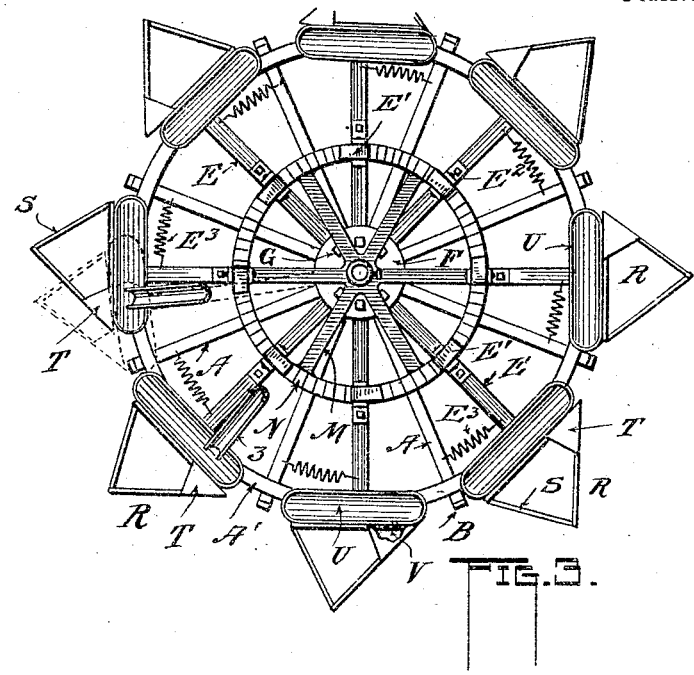
Figure 4:
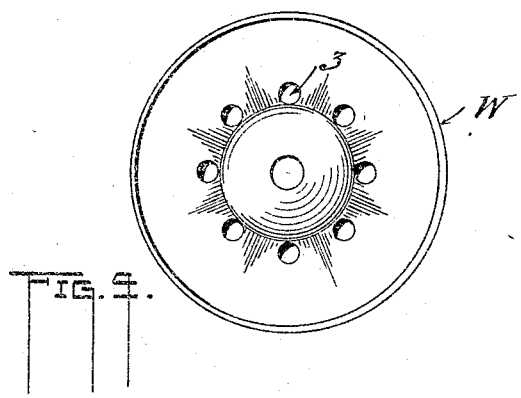

Figure 1 is a sectional elevation of the machine. Fig. 2 shows portions of the mechanism in perspective. Fig. 3 is a plan of certain operating parts; and, Fig. 4 is a plan of a feed receiving hopper.

I provide a base, preferably a casting, which comprises a series of arms A, for example, radiating from a common point and provided with a ring portion A' and supporting legs B. C is a cylindrical casing or body suitably mounted on said base, its lower edge being high above the ground or the surface upon which the supporting legs rest, see Fig. 1.

The inner ends of the arms terminate in a central plate D which forms a support for the inner ends of a series of arms E, each of which is pivoted to said plate D. As a preferred structure, a plate F overlies the ends of the arms, and bolts G extend through both plates and the arms constitute pivots for the latter.

Depending from the plate D is a boss H bored to receive an upright rod J secured therein by means of a set-screw K, for example, though other methods may be employed for supporting and holding the rod rigid relative to the base and said plate D.

The rod J receives a tube L, adapted to turn upon it, and to the lower end of which is secured a wheel M provided with ratchet teeth N. Said tube L, which in effect constitutes a shaft, is secured in the hub of said wheel by any suitable means, said hub bearing upon the plate F. Secured to the upper end of the rod J is one of the burs P of a feed grinding mechanism while secured in any good manner to the tube L is the companion bur Q of said feed grinding mechanism.

The outer ends of the arms E project outward from beneath the casing C and each has secured to it a feeding pan or tray R. This tray is made up of two side members or walls at an acute angle relatively, and a bottom. Preferably at the rear end of the tray, or that end where the sides are widely separated, and resting upon the bottom, is a low wall S which serves to retain the feed in the tray. Preferably there is an overhanging portion T lying upon the sides at the forward end, which together with the part described, constitutes a pocket in the said forward end of the tray.

Secured to one of the walls of the latter or that lying nearest the casing C is a hopper U and in the said wall to which it is secured is a hole V well up toward the point of the tray. The bottom of the hopper is slanted toward the hole so as to cause any material delivered into it to pass through said hole V into said pocket.

It is observed that the tray lies just outside of the casing C while its hopper U lies just within it. In other words, the casing substantially overhangs the inner wall of the tray or that to which said hopper U is attached.

W is a hopper inside the casing C suspended from the stationary part P of the grinding mechanism or from any other convenient part of the machines such as the hopper 2 which received the grain or other material to be reduced. Communicating with the bottom of said hopper is a series of chutes 3, the lower end of each of which terminates above one of the hoppers U of the trays R so that the feed reduced by the members P Q after dropping into W may find its way to each of the said trays. The bottom of the hopper W between each of the openings into the chutes 3 is so constructed that any and all of the material will be directed into said chutes, each receiving substantially the same amount.

The wheel M carrying the ratchet teeth N lies above the arms E, as shown in Figs. 1 and 2, and said arms are provided each with a pawl E', pivoted on a casting $E^2$ of the arm, and arranged to engage said teeth.

In Figs. 2 and 3 I have indicated in broken lines the lateral movement of one of the arms upon its pivot, the movement being caused by the action of the animal in feeding at the tray R, the said arms sliding upon the described ring portion A' of the base as a support.

The operation of the machine is as follows:—After placing in the hopper the material to be reduced, a few grains of feed are placed in one or more of the trays. The animal in attempting to reach into the pointed end or pocket of the trays will push the tray so as to swing the arm. This results in a movement of the pawl which by engaging the ratchet teeth causes a movement of the wheel and a reduction of a small amount of feed which is deposited in the hopper W, finding its way to the several trays at the forward ends or pockets. Evidently one or more animals may thus operate the machine, the actions of the several animals being independent of one another. And as long as one or more animals are feeding the material will be delivered. The movement of the several arms is but a few inches so that the animal is not required to move in the slightest degree—merely employing the natural rooting action.

Any suitable stop may be placed at each side of the arms E to limit the extent of movement of the same as, for example, in Fig. 2, I show a member $a$ between the plates D F for this purpose though any other means for the purpose may be provided.

It is observed that the hopper U as viewed from the top, is made of some length and lies substantially perpendicular to the longest measurement of the arm E carrying it. Since the chutes 3 are stationary and the trays R have the lateral swinging movement described it is required that the hopper should have such a length that in its extremes of movement it will not pass from beneath the delivery end of the chute.

I have provided a spring $E^3$ for each of the arms so that said arms will be returned to their normal positions after each movement imparted by the animal.

One end of each spring is attached to any suitable part of the base while the other is attached to the arm. Thus arranged, the device is quite simple.

It is evident that if the feed reducing members P, Q, were increased in size a larger amount of material would be reduced in a given movement of the arm as the said members are increased in diameter. By this method, a gear train for speeding up the feed reducing members is not required, any suitable amount of the feed being delivered to each tray.

I reserve the right to make changes and alterations in my improved machine without departing from the spirit of the invention and the scope of the appended claims.

Having thus described my invention, I claim:—

1. In a machine of the nature described, a support, a member mounted thereon and adapted to have a limited oscillating movement laterally and including a feeding pan or tray, a material grinding means, and mechanism interposed between the member and said means by which to impart movement to the latter.

2. A machine of the nature described including in combination, a member adapted and arranged to oscillate in a lateral direction, a material grinding or reducing means, mechanism interposed between the member and said means and operatively engaging each, said member adapted to move in one direction independently of said means, and a feed tray mounted on the member in position to receive reduced material from said reducing means.

3. A machine of the nature described including in combination, a pivotally supported member adapted and arranged to swing upon its pivot, a material grinding or reducing means, mechanism interposed between the member and said means and operatively engaging each, said member adapted to move in one direction independently of said means, and a feed tray mounted on the member in position to receive reduced material from said reducing means.

4. In a machine of the nature described, a support, a member mounted thereon adapted to have a limited oscillating movement horizontally, a material grinding or reducing means, mechanism interposed between the member and said means and operatively engaging each by which movement is imparted from the former to the latter, and a feed tray mounted on the member.

5. In a machine of the nature described, the combination of a support, a member supported thereby and adapted to oscillate in a lateral direction, a material grinding or reducing means, mechanism interposed between the member and said means and operatively engaging each whereby motion is imparted to the grinding or reducing means in the movement of the said member, said member adapted to move in one direction independently of said means, and a feed tray mounted on the mechanism in position to receive reduced material from the reducing means and moved by an animal feeding from it.

6. In a machine of the nature described, the combination of a support, a member supported thereby and adapted to oscillate in a sidewise direction, feed grinding or reducing means mounted on the support, mechanism interposed between and operatively engaging both said member and the said means, said member adapted to move in one direction independently of said means, and a feed tray mounted on the member engaged and moved by an animal in the act of feeding therefrom to impart said sidewise direction of movement.

7. In a machine of the nature described, the combination of a support, a member having pivotal connection therewith and adapted to have a lateral or side to side movement on its pivot, a feed grinding or reducing means, mechanism operatively engaging both the said member and the said means and adapted to impart movement to the latter in one direction of movement of said member, said member adapted to move in one direction independently of said means, and a feed tray mounted on the member and engaged by an animal in the act of feeding to impart said side to side movement.

8. In a machine of the nature described, the combination of a support, a member mounted on and adapted to have a limited movement with respect to said support, a feed grinding or reducing means, mechanism moved by the said member and operatively engaging the said grinding or reducing means, a feed tray carried by the member and moved by pressure in one direction thereon by an animal in the act of feeding from it, and means to impart movement elastically to the member in opposition to the movement imparted to it by the animal.

9. In a machine of the nature described, the combination with a material grinding or reducing means, a member adapted and arranged to have a limited oscillating movement and including an extension in position to be engaged by the nose of an animal in feeding, and moved in one direction by said animal, elastic means to move the member in an opposite direction, mechanism operated by the member and operatively engaging the said reducing means, and a part in position to receive the reduced material from the reducing means and direct it to said extension.

10. In a machine of the nature described, the combination with a member adapted and arranged to have a limited oscillating movement laterally including a feed tray, a material reducing means and mechanism operated by the member operatively engaging said means, the said member being operated by an animal feeding from the tray, and a member in position to receive the reduced material from the reducing means and arranged to deliver it to the tray in either extreme position of said tray.

11. In a machine of the nature described, a support, a member pivoted at one end relatively thereto, including a receptacle at its other end, a material grinding or reducing means, mechanism including a part fixed relatively to one of the described portions, and a part pivoted to the other of the portions, the parts adapted to engage one another for imparting movement to said grinding or reducing means.

12. In a machine of the nature described, a support, a member pivoted at one end thereto adapted to oscillate and including a receptacle at its other end, a material grinding or reducing means, and mechanism to operate the same including a part fixed relatively to a portion of the said means, and a part carried by the member adapted to engage and operate the first named part intermittently due to the action of a feeding animal.

13. In a machine of the nature described, the combination of an arm pivotally supported near one of its extremities and adapted to oscillate in a substantially horizontal direction and including a receptacle near its other extremity, a material grinding or reducing means, and mechanism interposed between the said arm and said means for imparting an intermittent advancing movement to the latter.

14. In a machine of the nature described, the combination of an arm pivotally supported near one end and adapted to move in one direction by pressure of an animal against it and including a feeding pan or tray at its outer end, means to retract said arm after movement imparted to it, a material grinding or reducing means, and mechanism interposed between the arm and said grinding means adapted in the said movement of the arm to impart a step by step movement to said means.

15. In a machine of the nature described, the combination of an arm pivotally supported near one end and adapted to move in one direction by pressure of an animal against it and including a feeding pan or tray at its outer end, means to retract said arm after movement imparted to it, a material grinding or reducing means, mechanism interposed between the arm and said grinding means adapted in the said movement of the arm to impart a step by step movement to said means, and means to conduct the reduced material to said pan or tray.

16. In a machine of the nature described, the combination of an arm mounted to swing in a lateral direction and including a receptacle for feed, said arm adapted to be swung by pressure of an animal against it, means to retract the arm after each movement, a material grinding or reducing means, mechanism interposed between the arm and the means to impart a progressive movement to the latter in each movement of the arm, and means to conduct the reduced material from said means to said pan or tray.

17. In a machine of the nature described, the combination of an arm mounted to swing in a lateral direction and adapted to be moved by pressure of an animal against it, a feed receptacle carried by the arm, a material grinding or reducing means operated from said arm, and stationary means to receive the material from said reducing means and deposit it into said pan or tray.

18. In a machine of the nature described, the combination with a member adapted and arranged to have a limited movement laterally by pressure of an animal and including a receptacle and a hopper portion, of a material reducing or grinding means operated from said member, and a stationary member overhanging the hopper portion and adapted to deposit the reduced material from said reducing means into the same.

19. In a machine of the nature described, the combination of a mounted member adapted to be moved in a lateral direction by pressure of an animal, and including a feeding pan or tray, and a hopper portion, means to retract the member after movement imparted by the animal, a material reducing or grinding means operated by said member, and a stationary member overhanging the said hopper portion adapted to deposit the reduced material into the same in either of its extreme positions.

20. In a machine of the nature described, the combination of a material reducing or grinding means, means to receive the reduced material therefrom including a chute, a member mounted for a lateral swinging movement by pressure of an animal upon it and including a feeding pan or tray and a hopper portion, said hopper portion adapted for receiving the material from said chute in either of the extremes of movement of said portion, and mechanism interposed between the reducing means and the member to impart movement to the said means in an intermittent manner.

21. In a machine of the nature described, the combination of a material reducing or grinding means, means to receive the reduced material therefrom including a chute, a member mounted for a lateral swinging movement by pressure of an animal upon it and including a feeding pan or tray and a hopper portion, said hopper portion adapted for receiving the material from said chute in either of the extremes of movement of said portion, and mechanism interposed between the reducing means and the member to impart movement to the said means in an intermittent manner, and means to retract the member after each movement imparted by the animal.

22. In a machine of the nature described, the combination of a support, a series of arms pivoted thereto each including a tray and adapted to swing in a lateral direction by pressure of an animal, a material reducing or grinding means, a member fixed relatively to one of the portions of said grinding means, a part carried by each of the said arms and adapted to engage the member, each of the arms adapted therethrough to impart movement to the member in one direction independent of the others of said arms, and means to convey the reduced material from said reducing means into each said tray.

23. In a machine of the nature described, the combination of a support, a series of arms pivoted thereto each including a tray and adapted to swing in a lateral direction by pressure of an animal, a material reducing or grinding means, a member fixed relatively to one of the portions of said grinding means, a part carried by each of the said arms and adapted to engage the member, each of the arms adapted therethrough to impart movement to the member in one direction independent of the others of said arms, means to convey the reduced material from said reducing means with each said tray, and means to retract each of the arms after movement imparted by the animal.

24. In a machine of the nature described, the combination of a support, a series of arms pivoted thereto each including a tray and adapted to swing in a lateral direction by pressure of an animal, a material reducing or grinding means, a ratchet wheel fixed relatively to a part of the grinding means, a pawl carried by each of the arms to engage the said ratchet wheel and each adapted to impart a partial movement to said wheel to advance the said reducing means, a spring to retract each arm after the movement imparted to it, and a part adapted to convey the reduced material separately to each tray.

In testimony whereof I affix my signature in presence of two witnesses.

ALFRED F. MEYER.

Witnesses:
W. I. SLEMMONS,
L. M. THURLOW.

Copies of this patent may be obtained for five cents each, by addressing the "Commissioner of Patents, Washington, D. C."